United States Patent
Kraft

[19]

[11] Patent Number: 6,135,890
[45] Date of Patent: Oct. 24, 2000

[54] TORSIONAL VIBRATION DAMPER

[75] Inventor: Gunther Kraft, Sinzheim, Germany

[73] Assignee: LuK Lamellen und Kupplungsbau GmbH, Buhl, Germany

[21] Appl. No.: 08/984,661

[22] Filed: Dec. 3, 1997

[30] Foreign Application Priority Data

Dec. 11, 1996 [DE] Germany ............... 196 51 385

[51] Int. Cl.$^7$ ........................................... F16D 3/12
[52] U.S. Cl. ................................. 464/68; 464/63
[58] Field of Search ................ 464/63, 66, 68; 192/212, 213, 213.1, 213.2; 74/574

[56] References Cited

U.S. PATENT DOCUMENTS

| | | | |
|---|---|---|---|
| 5,240,458 | 8/1993 | Linglain et al. | 464/68 |
| 5,246,398 | 9/1993 | Birk et al. | 464/63 |
| 5,251,736 | 10/1993 | Jeppe et al. | 464/68 |
| 5,374,218 | 12/1994 | Reik et al. | |
| 5,409,091 | 4/1995 | Reik et al. | |
| 5,711,407 | 1/1998 | Maier | 192/213 |
| 5,722,525 | 3/1998 | Ament et al. | 464/63 |
| 5,722,895 | 3/1998 | Graton et al. | 464/68 |
| 5,769,721 | 6/1998 | Tauvron et al. | 464/68 |
| 5,771,999 | 6/1998 | Kleifges et al. | 464/68 |
| 5,795,230 | 8/1998 | Lefevre | 464/63 |
| 5,816,925 | 10/1998 | Mixukami | 464/68 |

FOREIGN PATENT DOCUMENTS

| | | |
|---|---|---|
| 40 31 762 A1 | 4/1992 | Germany . |
| 41 41 643 A1 | 6/1992 | Germany . |

*Primary Examiner*—Lynne H. Browne
*Assistant Examiner*—Greg Binda
*Attorney, Agent, or Firm*—Darby & Darby

[57] ABSTRACT

A torsional vibration damping apparatus, such as a clutch disc or clutch plate in an automated or manually operable friction clutch which is employed in the power train of a motor vehicle, has a rotary input component adapted to be driven by a prime mover, a rotary output component coaxial with the input component and arranged to transmit torque to a manually or automatically shiftable transmission, and several series-connected torsional vibration dampers serving to oppose rotation of the input and output components relative to each other. At least one of the dampers constitutes a preassembled module wherein coaxial annular input and output elements are provided with arcuate pockets for circumferentially extending coil springs serving to oppose rotation of the input and output elements relative to each other. The elements are further provided with rigid and/or resilient projections and/or other suitable confining configurations which can couple the elements to at least one of the coil springs to thus hold such elements against movement axially and away from each other.

20 Claims, 3 Drawing Sheets

TORSIONAL VIBRATION DAMPER

BACKGROUND OF THE INVENTION

The present invention relates to improvements in torsional vibration dampers, and more particularly to improvements in apparatus which embody one or more dampers to prevent the transmission of torsional vibrations and/or other stray movements from a rotary input component to a rotary output component which can rotate with and relative to the input component.

It is already known to prevent the transmission of undesirable vibratory and/or other stray movements from a rotary input component to a rotary output component by resorting to torque transmitting means in the form of several torsional vibration dampers. For example, the torque transmitting means can comprise a first or auxiliary damper with coaxial rotary input and output elements and one or more energy storing devices (such as coil springs) between such elements, and a second or main damper with energy storing devices which are normally stiffer (i.e., more resistant to deformation) than the energy storing device or devices of the first damper.

Apparatus with plural torsional vibration dampers are disclosed, for example, in published German patent applications Serial Nos. 41 41 643 and 40 31 762. Each such apparatus can be utilized in the power train of a motor vehicle (e.g., as a clutch disc or clutch plate in a manually operable or automated friction clutch) and comprises a first (so-called idling) torsional vibration damper or system as well as a second or main or primary damper or load system. The first damper is equipped with abutments or stops which prevent further deformation of its energy storing device or devices when the torque being transmitted by the first damper rises to a preselected value; if the input and output components of such torsional vibration damping apparatus continue to turn relative to each other, the torsional vibration damping operation is taken over by the main damper. That torque at which the first damper becomes ineffective and the damping operation is taken over by the main damper is any torque that exceeds the so-called idling torque; for example, idling torque is that torque which is being transmitted by the clutch disc or clutch plate of a fully engaged friction clutch when the engine is running to drive a flywheel of the clutch but the transmission (which receives torque from the clutch disc) is shifted into neutral gear. At such time, the engine-driven flywheel cooperates with an axially movable rotary pressure plate of the friction clutch to drive the clutch disc (e.g., with minimal slip or without slip between the friction surfaces of the flywheel and the clutch disc on the one hand, and the respective sets of friction linings of the clutch disc on the other hand) but the clutch disc cannot cause the wheels of the motor vehicle to rotate because the transmission which is to transmit torque from the clutch disc to the wheels is disengaged, i.e., in neutral gear. The just described mode of assembling and operating the power train of a motor vehicle has been found to be highly satisfactory under a wide variety of circumstances of operation or use of a motor vehicle wherein a friction clutch with a clutch disc is designed to transmit torque from a prime mover (such as a combustion engine) to the driven wheels by way of an automated or manually shiftable transmission and (if necessary) a differential for the live axles.

Published German patent application Serial No. 195 22 225 and the corresponding U.S. patent application Ser. No. 08/475,295 disclose modified torsional vibration damping apparatus with two dampers which operate in series. The construction and the mode of operation of the first damper in such apparatus constitute improvements over and further developments of the construction and mode of operation of first dampers which are disclosed in the aforementioned published German patent applications Serial Nos. 41 41 643 and 40 31 762.

The disclosures of all U.S. patents and allowed U.S. patent applications, as well as of all U.S. patents and/or allowed U.S. patent applications corresponding to foreign patents and/or patent applications, enumerated in this specification are to be considered as being incorporated herein by reference.

OBJECTS OF THE INVENTION

An object of the instant invention is to provide a torsional vibration damping apparatus which can be assembled and installed (e.g., in the power train of a motor vehicle) in a novel and improved way.

Another object of the invention is to provide a novel and improved preassembled unit or module which can be utilized as one of torsional vibration dampers in the apparatus of the present invention.

A further object of the invention is to provide a novel and improved clutch disc or clutch plate for use in a torque transmitting system, for example, in a friction clutch which is installed in the power train of a motor vehicle.

An additional object of the invention is to provide a simple and inexpensive but highly versatile and reliable torsional vibration damping apparatus with plural dampers.

Still another object of the invention is to provide a novel and improved mode of joining the constituents of a torsional vibration damper, either in the manufacturing plant or at the locale of use (e.g., in an automobile assembly plant).

A further object of the invention is to provide a novel and improved combination of plural series-connected torsional vibration dampers.

Another object of the invention is to provide a power train which embodies the above outlined torsional vibration damping apparatus.

An additional object of the invention is to provide a motor vehicle wherein the power train embodies at least one torsional vibration damping apparatus of the above outlined character.

Still another object of the invention is to provide a novel and improved method of reliably but separably assembling the constituents of a torsional vibration damper for use in a clutch disc or the like.

A further object of the invention is to provide a torsional vibration damping apparatus wherein the rotary input and output parts of at least one of plural torsional vibration dampers are designed and can be assembled with energy storing devices in a novel and improved manner.

Another object of the invention is to provide a novel and improved coupling for certain constituents of a torsional vibration damper which can be utilized in the above outlined apparatus.

An additional object of the invention is to provide a novel and improved clutch disc or clutch plate which can be utilized as a superior substitute for the clutch discs or clutch plates of conventional design, e.g., in the automated or manually operable friction clutches for use in the power trains of motor vehicles to transmit torque between a prime mover (such as an internal combustion engine) and a manually or automatically shiftable transmission.

Still another object of the invention is to provide a novel and improved combination of plural torsional vibration dampers and one or more friction generating devices for use in a clutch disc or the like.

SUMMARY OF THE INVENTION

One feature of the present invention resides in the provision of a torsional vibration damping apparatus which comprises an input component (e.g., two coaxial discs secured to each other by rivets and carrying friction linings arranged to be clamped between the flywheel and the clutch plate of a friction clutch) and an output component (e.g., a hub which can transmit torque to the input shaft of a transmission). The two components are rotatable with and relative to each other about a common axis and the apparatus further comprises at least one damper which serves to oppose rotation of the input and output components relative to each other. In accordance with one presently preferred embodiment of the invention, the at least one damper comprises input and output elements which are respectively rotatable with the input and output components and are movable relative to each other in the direction of the common axis, and at least one energy storing device (such as a coil spring) which is arranged to yieidably oppose rotation of the two elements relative to each other. The two elements and the at least one energy storing device have means for opposing axial movements of the two elements relative to each other.

Another feature of the invention resides in the provision of a torsional vibration damping apparatus which comprises a first damper and a second damper. The two dampers can be installed to operate in series and the first damper includes coaxial annular input and output elements which are rotatable with and relative to each other about a common axis and each of which has a plurality of pockets. The first damper further comprises energy storing devices which are deformable in a circumferential direction of the annular elements and each of which extends into a pocket of the input element as well as into a pocket of the output element. The two elements have surfaces bounding their respective pockets and being positioned and configurated to locate the respective energy storing devices radially as well as in the direction of the common axis. Each of the two annular elements is further provided with confining means for at least one of the energy storing devices, and such at least one energy storing device cooperates with the confining means of the two annular elements to couple such elements against movement relative to each other in the direction of their common axis.

The energy storing devices extend into the repective pockets of the two annular elements as a result of axial movement of at least one of the two annular elements toward the other element against the opposition of the energy storing devices and/or the confining means. The axial movement is terminated when the surfaces of the annular elements abut the energy storing devices in the respective pockets. The confining means and the at least one energy storing device cooperate to couple the two elements to the at least one energy storing device, preferably by snap action during the last stage of axial movement of the at least one element toward the other element.

The confining means of at least one of the two elements is preferably provided with a face which follows the outline of a portion of the at least one energy storing device radially of the axis as well as in the circumferential direction of the two elements. Such face can be provided on a projection of the respective confining means.

The two elements of the first damper can be provided with confining means for at least two energy storing devices, and at least one confining means for each of the at least two energy storing devices can be provided with a face (configuration) which follows the outline of a portion of the respective one of the at least two energy storing devices radially of the common axis as well as in the circumferential direction of the input and output elements.

At least a portion of at least one of the confining means can be resilient (elastically deformable) in a direction at least as seen radially of the common axis. Such resilient portion can include at least one tongue extending in at least substantial parallelism with the common axis. The arrangement can be such that the confining means of one of the two elements is at least substantially rigid and at least a portion of the confining means of the other element is at least partly resilient. The confining means having a resilient portion is preferably provided on the output element of the first damper.

The confining means can be disposed between the ends of the respective pockets, as seen in the circumferential direction of the two elements, and each confining means is or can be spaced apart from at least one end of the respective pocket. Alternatively, the confining means can be closely adjacent at least one end of each pocket for the at least one energy storing device or for the at least two energy storing devices.

At least one of the confining means can comprise at least one tongue which extends substantially in the direction of the common axis of the two elements and is disposed radially inwardly or radially outwardly of the respective energy storing device.

The confining means of the two elements of the first damper can be disposed at opposite sides of a first plane which includes the common axis and/or of a second plane which is normal to such axis.

Each pocket can include or constitute a channel for a portion of the respective energy storing device. Each such channel is or can be an arcuate channel having a center of curvature at least close to the common axis of the two elements.

A further feature of the invention resides in the provision of a torsional vibration damping apparatus which comprises a rotary input component, a rotary output component which is rotatable with and relative to the input component about a common axis and can include a hub having an internal profile and an external profile (e.g, an internal spur gear and an external spur gear), and means for yieldably opposing rotation of the two components relative to each other. The opposing means comprises a first damper including a plurality of first energy storing devices having a first rigidity, and a second damper comprising at least one second energy storing device having a second rigidity greater than the first rigidity. The first damper further includes annular input and output elements which are rotatable relative to each other about the aforementioned common axis against the resistance of the first energy storing devices and the second damper further comprises input and output members which are rotatable relative to each other about the common axis against the resistance of the at least one second energy storing device. The output element of the first damper is non-rotatably secured to the hub and the output member of the second damper has an internal profile mating with the external profile of the hub with limited freedom of angular movement relative to the hub. Each of the two elements of the first damper has a plurality of pockets extending radially of the common axis and circumferentially of the two (annular) elements, and each of the first energy storing devices is received in part in a pocket of the input element and in part in a pocket of the out put element and is compressible in the circumferential direction of the two elements in response to rotation of the two elements relative to each other. Each pocket of the input element confronts a pocket of the output element, and the two elements have surfaces bounding their pockets and at least partially following the outlines of adjacent portions of the respective first energy storing devices. Each of the two elements further comprises confining means cooperating with at least one of the first energy storing devices to couple the two elements to each other (by way of the at least one first energy storing device) against movement relative to each other in the direction of the common axis. The first damper can be said to constitute a module or prefabricated or preassembled unit which is preassembled as a result of axial movement of at least one of the input and output elements toward the other of these elements and resulting coupling (attachment) of the two elements to each other by way of the confining means and the at least one energy storing device.

The novel features which are considered as characteristic of the invention are set forth in particular in the appended claims. The improved torsional vibration damping apparatus itself, however, both as to its construction as well as the mode of assembling, installing and utilizing the same, together with numerous additional important and advantageous features thereof, will be best understood upon perusal of the following detailed description of certain presently preferred specific embodiments with reference to the accompanying drawings.

DESCRIPTION OF PREFERRED EMBODIMENTS

Figure 1:
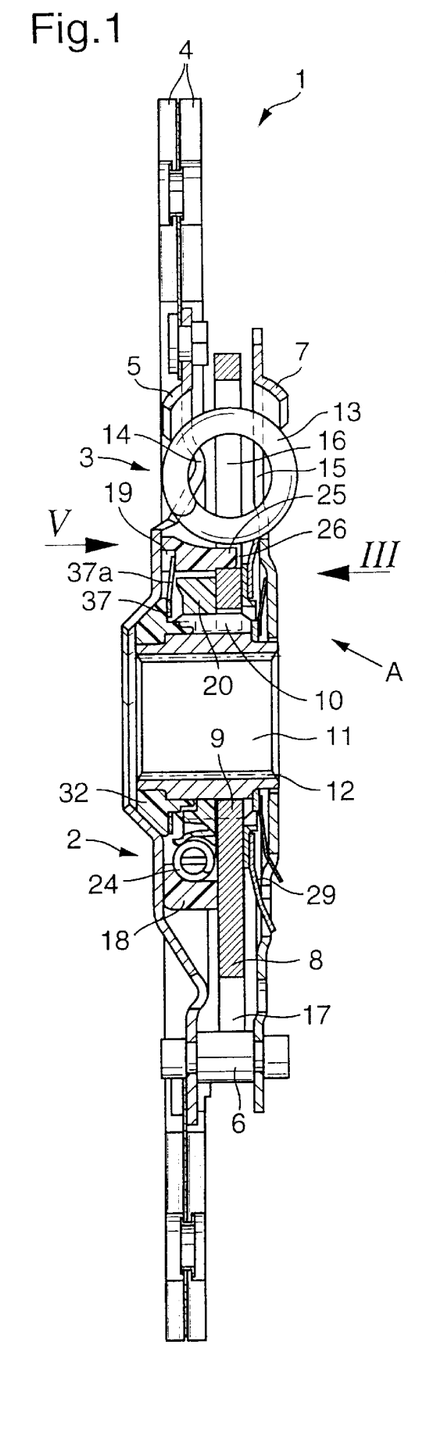
FIG. 1 is an axial sectional view of a clutch disc or clutch plate which constitutes a torque transmitting and torsional vibration damping apparatus and employs two dampers one of which is constructed, assembled and mounted in accordance with one presently preferred embodiment of the invention.

FIG. 1 shows a torsional vibration damping apparatus 1 which is a clutch disc or clutch plate adapted to be utilized in a manually operable or automated torque transmitting system, for example, in a friction clutch of the type shown in FIG. 2 of commonly owned U.S. Pat. No. 5,409,091 granted Apr. 25, 1995 to Reik et al. for "AUTOMATICALLY ADJUSTABLE FRICTION CLUTCH". The apparatus 1 comprises a first torsional vibration damper 2 and a second or main or primary torsional vibration damper 3.

The input component of the apparatus 1 comprises a rotary disc 5 carrying two sets of friction linings 4 and being non-rotataby secured to a coaxial second disc 7 by a set of rivets 6 adapted to maintain the two discs 5, 7 at a fixed axial distance from each other. The input component 4–7 of the apparatus 1 further constitutes the input member of the main damper 3. The output member of the main damper 3 comprises a rotary washer-like member 8 (called flange) having an internal profile 9 (such as an internal spur gear) loosely meshing with the external profile 10 (such as an external spur gear) forming part of a hub 11 which constitutes the output component of the apparatus 1.

Figure 3:
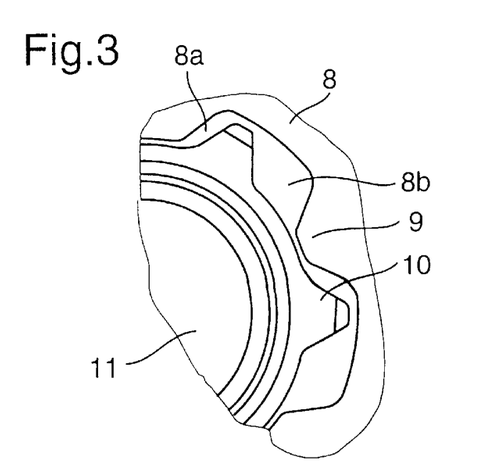
FIG. 3 is an enlarged fragmentary elevational view of a detail as seen in the direction of arrow III in FIG. 1.

As can be seen in FIG. 3, the external profile 10 of the hub 11 and the internal profile 9 of the flange 8 mate with a certain play (indicated at 8a and 8b) and the extent of such play (8a+8b) corresponds to (i.e., determines) the range of the first damper 2. The hub 11 is further provided with an internal profile 12 (e.g., a set of alternating axially parallel ribs and flutes) serving to transmit torque between the apparatus 1 and another constituent of a power train, e.g., in a motor vehicle. As disclosed, for example, in commonly owned U.S. Pat. No. 5,374,218 granted Dec. 20, 1994 to Reik et al. for "ASSEMBLY FOR COMPENSATION OF FLUCTUATIONS OF TORQUE", a friction clutch employing a clutch disc corresponding to the apparatus 1 of FIG. 1 can be utilized in a power train to transmit torque between an engine-driven flywheel (which transmits torque to the input component 4–7 in conjunction with an axially movable pressure plate when the engine is driven and the clutch is at least partially engaged) and an input shaft of a transmission (such input shaft is non-rotatably engaged by the internal profile 12 of the hub 11).

The main damper 3 further comprises a plurality of arcuate energy storing devices 13 (such as elongated coil springs having their centers of curvature on the common axis of the input (4–7) and output (11) components of the aparatus 1). This axis is common to the input (4–7) and output (8) members of the main damper 3 as well as to the annular input and output elements 18, 20 of the first damper 2. The energy storing devices 13 (hereinafter called springs or coil springs) are received in axially aligned or overlapping windows 14, 15 of the discs 5, 7 of the input member 4–7 as well as in windows 16 provided in the flange 8 (the latter is installed between the discs 5 and 7, as seen in the axial direction of the apparatus 1). Thus, the input member 4–7 and the output member or flange 8 of the main damper 3 can turn relative to each other about their common axis by overcoming the resistance of the relatively stiff coil springs 13. The extent of angular movement of the discs 5, 7 and the flange 8 relative to each other is determined or limited by the shanks of the rivets 6 (which rigidly secure the discs 5, 7 to each other in fixed angular and axial positions) and surfaces bounding cutouts 17 provided in the radially outer marginal portion of the flange 8 and each loosely receiving the shank of one of the rivets 6. Other means for limiting the extent of angular movements of the input and output members of the main damper 3 relative to each other can be employed with equal or similar advantage.

The first damper 2 is installed between the flange 8 and the disc 5 of the main damper 3 (as seen in the axial direction of the torsional vibration damping apparatus 1). The annular input element 18 of the damper 2 is preferably made of a suitable synthetic plastic material and is coaxially and non-rotatably affixed to the flange 8 (e.g., by resorting to an adhesive or in any other suitable way). The preferably plastic annular output element 20 of the damper 2 is disposed radially inwardly of (see FIGS. 1 and 2) and is coaxial with the input element 18 and is non-rotatably coupled to the hub 11 of the output component of the apparatus 1.

As already mentioned above, the range of the first damper 2 (namely the extent of angular movability of the input and output elements 18, 20 relative to each other) is determined by the play $8a+8b$ (refer again to FIG. 3) between the internal profile 9 of the flange (output member) 8 of the main damper 3 and the external profile 10 of the hub 11. Such play $8a +8b$ is possible when the apparatus 1 is not called upon to transmit torque between the input component 4–7 and the output component (hub) 11.

In order to turn the input and output members 18, 20 of the first damper 2 relative to each other, it is necessary to overcome the resistance of a set of energy storing devices 24 (such as arcuate coil springs and hereinafter called springs or coil springs). Each spring 24 extends into an arcuate pocket or channel 21 of the input element 18 and in part into a similar arcuate pocket or channel 22 of the output element 20. The stiffness of the springs 24 is less pronounced than that of the springs 13.

The radially inner portion of the output element 20 of the damper 2 is profiled, as at 20a, and meshes (without play or with negligible play) with the external profile 10 of the hub 11 (see FIGS. 1, 2, 4 and 6).

Figure 4:
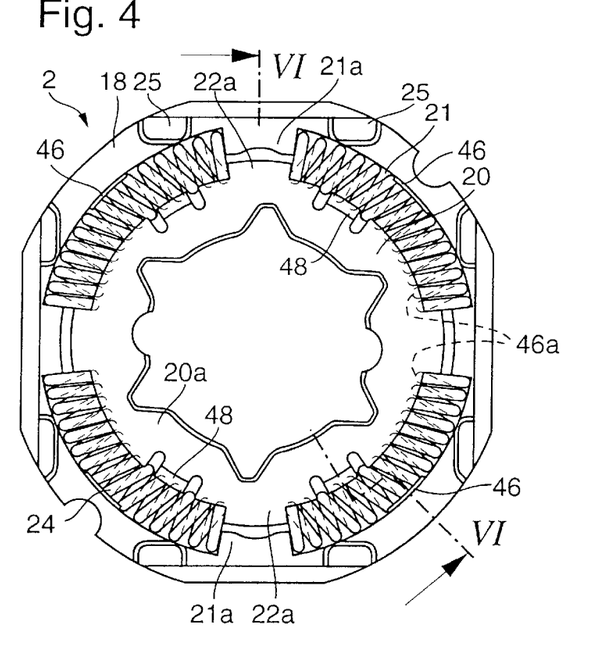
FIG. 4 is an enlarged fragmentary elevational view of another detail as seen in the direction of arrow III in FIG. 1.
Figure 6:
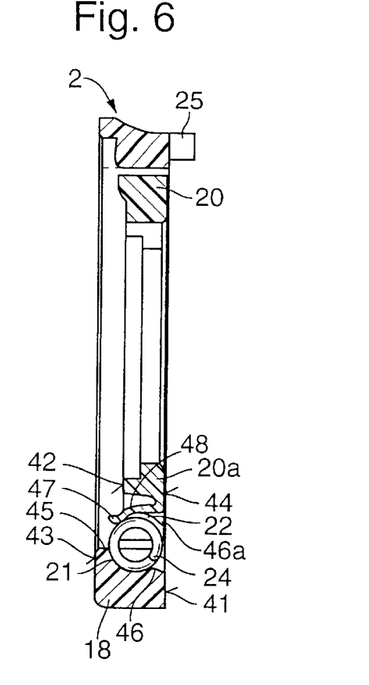
FIG. 6 is a composite axial sectional view substantially as seen in the direction of arrows from the line VI—VI in FIG. 4.

The input element 18 of the damper 2 is form-lockingly connected with (so that it cannot rotate relative to) the flange 8. To this end (and as can be seen in FIGS. 1, 4 and 6), the input element 18 comprises an annulus of preferably equidistant protuberances 25 in the form of axially parallel lugs which are received (with no play or with negligible play) in complementary axially parallel recesses or sockets 26 of the flange 8. The sockets or recesses 26 can constitute radially inwardly oriented extensions of the windows 16 provided in the flange 8 and serving to receive the median portions of the respective springs 13.

Figure 2:
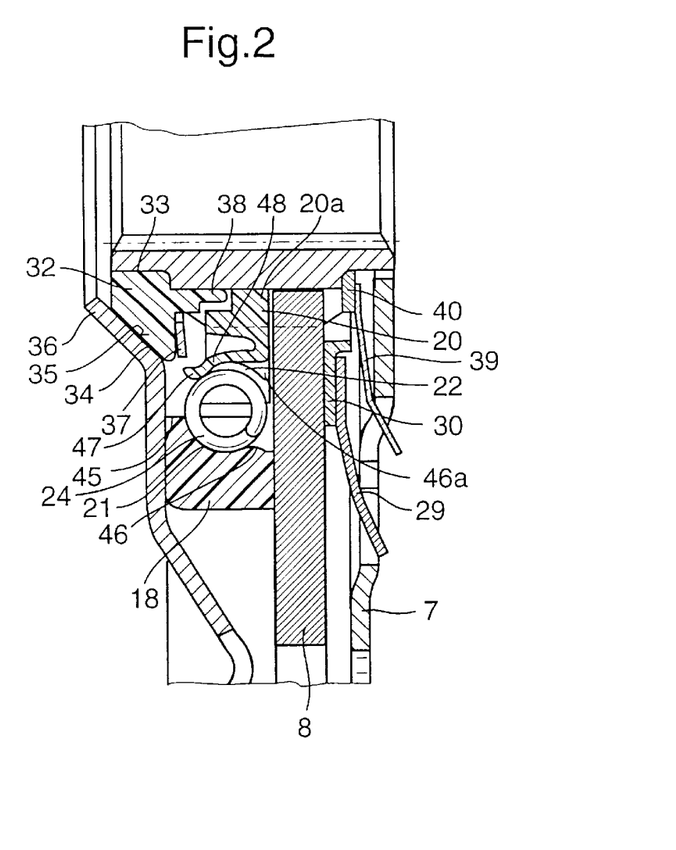
FIG. 2 is an enlarged view of a detail A in the clutch disc or clutch plate which is illustrated in FIG. 1.
Figures 5, 7, 8:
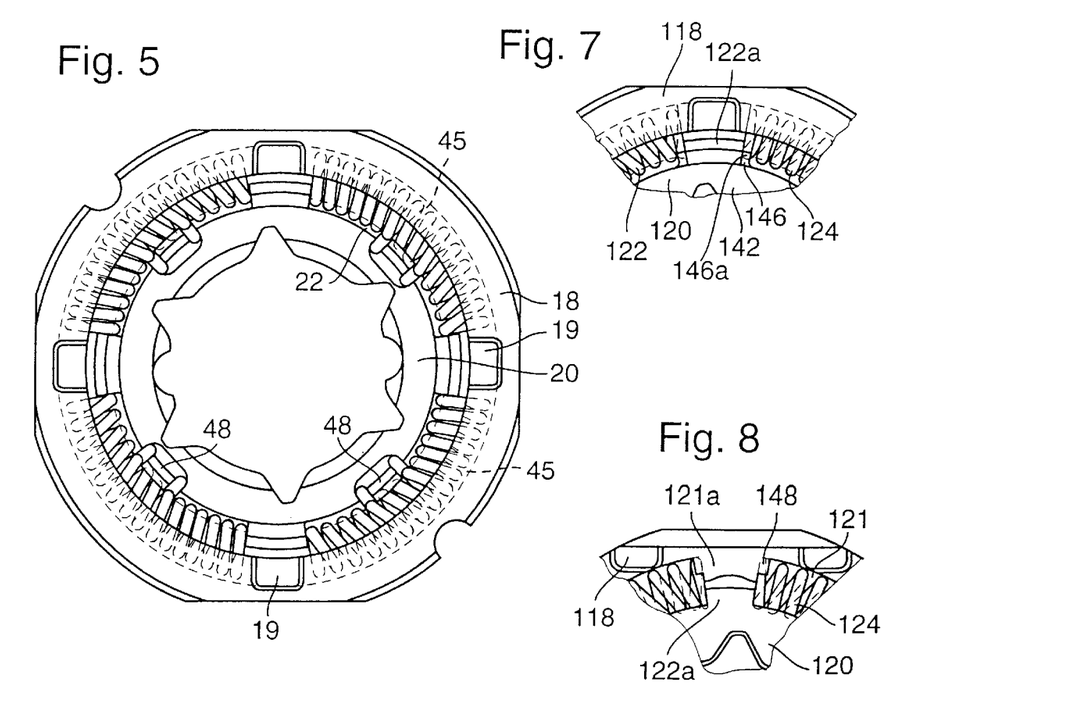
FIG. 5 is an enlarged fragmentary elevational view of a further detail as seen in the direction of arrow V in FIG. 1.
FIG. 7 is a fragmentary elevational view of certain details of a damper constituting a modification of the corresponding details of the damper which is shown in FIGS. 1 to 6 and being adapted to be utilized in the torsional vibration damping apparatus of the present invention.
FIG. 8 is a fragmentary elevational view of certain other details of the damper embodying the structure of FIG. 7.

As can be seen in FIGS. 4 and 5, the pockets or channels 21 and 22 of the input and output elements 18, 20 have an arcuate shape with centers of curvature on the axis of the apparatus 1. The configuration of the surfaces bounding the pockets or channels 21, 22 is preferably such that these surfaces contact the convolutions of the respective springs 24 in a circumferential direction of the elements 18, 20 as well as in the axial direction of the apparatus 1. FIG. 2 shows that the surface bounding the pocket 21 in that portion of the input element 18 which can be seen in FIG. 2 extends first in parallelism with the axis of the apparatus 1 away from the flange 8 and thereupon contacts a substantial portion of each convolution of the respective spring 24 to thereupon extend parallel to the axis of the apparatus 1 toward the adjacent side of the disc 5. The depth of those portions of the pockets 21 which receive parts of the respective springs 24 (namely the depth as measured in the axial direction of the apparatus 1) is selected in such a way that each spring 24 is at least substantially surrounded by the surface bounding the corresponding pocket 21.

As can be seen in FIG. 4, the end convolutions of the springs 24 abut stops 21a which form part of the input element 18 and are disposed at the ends of the pockets 21 (as seen in the circumferential direction of the element 18). These stops 21a cooperate with stops 22a provided at the ends of arcuate pockets 22 in the output element 20 to stress (i.e., compress or shorten) the springs 24 when the elements 18, 20 are caused to turn relative to each other.

The pockets 21 are provided in the (radially) inner side of the input element 18, and the pockets 22 (each of which confronts a pocket 21) are provided at the radially outer side of the output element 20. Referring again to FIG. 2, each pocket 22 is configured and dimensioned in such a way that the surface bounding this pocket at least substantially confines the radially inner portions of convolutions of the respective spring 24. The pockets 22 can be formed in the output element 20 during making of the element 20 in an injection molding or other suitable plastic processing machine. The same holds true for the pockets 21 in the preferably plastic input element 18.

FIG. 2 further shows that a spring 24 which is properly held in the corresponding pockets 21, 22 can serve as a coupling or connecting part which holds the elements 18, 20 against axial movements away from each other. To this end, the elements 18, 20 respectively comprise suitably configurated confining projections or portions 46, 47 which engage the springs 24 by snap action during the last stage (or close to the last stage) of axial movement of the element 18 toward the element 20 (and/or vice vera) in order to assemble a module which constitutes a prefabricated damper 2 ready to be stored, shipped to an automobile assembly plant and assembled with other parts of the apparatus 1 for use in the power train of a motor vehicle.

Each confining projection or portion 46 has a face which directly engages or is closely adjacent a radially outer portion of the adjacent spring 24, and each confining projection or portion 47 has a face which directly contacts or is closely adjacent a radially inner portion of the respective spring 24. In this manner, each spring 24 can be held by snap action between the face of the adjacent confining portion 46 and the face of the adjacent confining portion 47 to thus ensure safe retention of the spring 24 in the surrounding pockets 21, 22.

The end portions of the arcuate pockets 22 are adjacent the aforementioned stops 22a forming part of the output element 20 (see FIG. 4) and cooperating with the neighboring stops 21a of the input element 18 to stress (shorten) the springs 24 in response to angular displacements of the element 18 relative to the element 20 and/or vice versa. The stops 21a, 22a are or can be configured and dimensioned in such a way that each thereof abuts about one-half of the adjacent end convolution of the respective spring 24 when the damper 2 is idle, i.e., when the stops 21a, 22a can assume the positions corresponding to those of the stops shown in FIG. 4. Each stop 21a then confronts and is located radially outwardly of the adjacent stop 22a. Reference may be had also to the lower portion of FIG. 6.

The axial position of the input element 18 relative to the disc 5 is fixed by a diaphragm spring 29 which reacts against the disc 7 and (indirectly) bears against the adjacent side of the flange 8 to urge the latter toward the disc 5; this ensures that the flange 8 bears upon the adjacent side of the element 18 and urges the other side of such element against the disc 5. A friction ring 30 is preferably inserted between the radially inner portion of the diaphragm spring 29 and the flange 8; the radially outer portion of the spring 29 reacts against the disc 7 and its radially inner portion causes the parts 30, 8 and 18 to bear against each other as well as against the inner side of the disc 5. At the same time, the diaphragm spring 29 biases the disc 5 in a direction to the right, as viewed in FIG. 1 or 2, because this spring reacts against the disc 7 which, in turn, pulls the disc 5 toward the flange 8 by way of the rivets 6.

The plastic material of the elements 18, 20 can be reinforced with filaments of glass or the like. The element 18 is in direct frictional engagement with the disc 5 which generates a frictional damping action for the main damper 3. When the discs 5, 7 are caused to turn relative to the flange 8 and/or vice versa, the friction ring 30 and the diaphragm spring 27 slip relative to each other to thus generate an additional frictional damping action for the second damper 3. It will be noted that the radially outer portion of the diaphragm spring 29 has prongs or tongues which are received in complementary cutouts of the disc 7 so that the parts 29 and 4–7 cannot turn relative to each other.

The damper 3 can further comprise a disc (called friction control plate) which cooperates with the springs 13 in such a way that it can be acted upon by the restoring force of the springs 13 to reassume a predetermined starting angular position relative to the discs 5, 7 and flange 8.

Referring again to FIG. 2, the disc 5 cooperates with a friction ring 32 which is inserted between the disc 5 and the external profile 10 of the hub 11 as seen in the axial direction of the apparatus 1. This friction ring surrounds a cylindrical peripheral surface 33 of the hub 11 and serves the additional purpose of centering the discs 5, 7 and the hub 11 relative to each other. To this end, the friction ring 32 has a wedge-shaped cross-sectional outline and is provided with a conical external surface 34 whch abuts a complementary conical internal surface 35 of the disc 5. This conical internal surface 35 is obtained as a result of appropriate shaping of the corresponding frustoconical annular intermediate section 36 of the disc 5.

The friction ring 33 is biased against the portion 36 of the disc 5 by a resilient element in the form of a diaphragm spring 37 having a circumferentially complete annular radially inner portion bearing against the ring 32 and radially outwardly extending prongs 37a (FIG. 1) reacting against the input element 18. The latter has recesses 19 for the radially outermost portions or tips of the prongs 37a. The axial bias of the diaphragm spring 37 is less pronounced than that of the diaphragm spring 29; this ensures that the annular input element 18 remains in frictional engagement with the disc 5.

The feature that the radially outermost portions of the prongs 37a of the diaphragm spring 37 extend into the recesses 19 of the input element 18 of the first damper 2 contributes to compactness of the apparatus 1 as seen in the direction of the common axis of the dampers 2 and 3. This will be readily appreciated by considering FIG. 1 which shows that the entire diaphragm spring 37 is disposed within the (axial) confines of the input element 18.

The friction ring 32 is provided with axially extending protrusions in the form of levers or arms 38 which engage the external profile 10 of the hub 11 to hold the parts 11 and 32 against excessive rotation relative to each other, namely to permit predetermined angular displacements of the hub 11 and the friction ring 32 relative to each other. This ensures that the friction ring 32 can carry out a predetermined angular movement relative to the hub 11. The width of internal teeth 20a of the output element 20 of the first damper 2 (as seen in the circumferential direction of the element 20) is greater than that of the arms 38 on the friction ring 32. It is presently preferred to select the width of the internal teeth 20a in such a way that the hub 11 and the output element 20 cannot turn relative to each other.

A further resilient element in the form of a diaphragm spring 39 (FIG. 2) is installed between the disc 7 and an optional friction ring 40 which abuts a radially extending shoulder of the hub 11. Thus, the diaphragm spring 39 biases the disc 7 and the hub 11 axially and away from each other. The diaphragm spring 39 is nonrotatably coupled to the disc 7. The purpose of the diaphragm spring 39 is to ensure that the input component 4–7 and the output component 11 of the apparatus 1 are maintained in predetermined axial positions relative to each other. Thus, the spring 39 pulls the disc 5 (by way of the disc 7 and rivets 6) in a direction toward the external profile 10 of the hub 11 to thus further clamp the friction ring 32 between the disc 5 and a radially extending shoulder of the hub 11.

FIGS. 4 and 5 show that the springs 24 of the damper 2 are elatively long (e.g., they can extend along arcs of approximately 70 degrees). These springs are preferably bent prior to insertion into the respective pockets 21 and 22. For example, each of these springs 24 can be imparted the ultimate shape (so that its axis is part of a circle having a center on the axis of the apparatus 1) prior to confinement between the elements 18, 20 of the damper 2. Such bending of the springs 24 contributes to simplicity of their insertion into the respective pairs of pockets 21 22, i.e., prior to coupling of the elements 18, 20 to ech other by way of the confining portions 46, 47 and one or more springs 24. Stated otherwise, the curvature of the springs 24 can be such (prior to insertion into the corresponding pairs of pockets 21, 22) that no further deformation or no appreciable further deformation of such springs is needed for the purpose of coupling the elements 18, 20 to each other in order to form a module which constitutes the damper 2. This can be achieved in that the arcuate central longitudinal axes of the prebent springs 24 coincide with the axes of composite arcuate receptacles each of which includes a pocket 21 and the confronting pocket 22. Eventual differences between the curvatures of the springs 24 prior and subsequent to insertion into the corresponding pairs of pockets 21, 22 might be attributable to manufacturing tolerances and/or to the memory of the resiliently deformable material of such springs.

However, it is equally within the purview of the present invention to select the initial curvature of the springs 24 in such a way that it departs from the curvature of the pockets 21, 22 to a predetermined extent.

Still further, it is possible to select the lengths of the springs 24 in such a way that the length of at least one of the springs departs from the length or lengths of the other spring or springs 24 by a certain value, e.g., by between 1° and 10°. This renders it possible to construct a multistage first damper 2 in an extremely simple, reliable and inexpensive manner. In other words, the resistance of such damper 2 to angular movements of the elements 18, 20 relative to each other can increase in one or more steps or stages. The same result or a similar result can be achieved by selecting the width(s) of one or more abutments or stops 21a or 22a to depart from (to be less than) the width of the other abutments or abutment.

The convolutions of the springs 24 abut the surfaces surrounding the respective pairs of confronting pockets 21 and 22. Thus, when the springs 24 are compressed as a result of angular displacement of the input and output elements 18, 20 from their starting or neutral positions, the convolutions of the springs 24 frictionally engage and slide along these elements. Such frictional damping action increases in response to progressing compression of (i.e., progressive storing of energy or additional energy by) the springs 24. The reason is that, as the springs 24 become shorter due to angular movement of the elements 18, 20 relative to each other, the median portions of these springs (as seen in the circumferential direction of the elements 18 and 20) tend to bulge radially outwardly and to come into progressively increasing frictional engagement with the surfaces bounding the (radially outer) pockets 21 of the radially outer element 18. Reference may be had to FIG. 6 which shows one of the springs 24 subsequent to its shortening as a result of angular displacement of the elements 18, 20 relative to each other from their starting positions. Thus, the radially outermost portions of the central convolutions of the spring 24 shown in FIG. 6 bear against the surface bounding the radially outer pocket 21 in the radially outer annular element 18. At the same time, one end convolution of such spring 24 bears against a stop 21a of the element 18 and the other end convolution bears against a stop 22a of the element 20.

In assembling the module which constitutes the damper 2, the springs 24 can be inserted first into the pockets 22 of the radially inner element 20, and the element 18 is then moved axially so that its pockets 21 receive progressively larger portions of the springs 24 until the two elements are ultimately coupled to each other by snap action whereby certain portions of the peripheral surfaces of the confined springs 24 are engaged by the adjoining faces of the confining portions 46 and 47. Alternatively, the springs 24 are first inserted into the pockets 21 of the radially outer element 18 and the elements 18, 20 are then moved axially toward each other until the confining portions 46, 47 engage the respective springs 22 by snap action. The snap action takes place when the faces of the confining portions 46 or 47 move over the radially outermost or the radially innermost portions of convolutions of the springs 24.

The assembling of the module which is shown in FIG. 6 can be carried out in such a way that the springs 24 are inserted into the pockets 21 of the radially outer element 18 (by moving the springs 24 toward and beyond the end face 41 of the element 18), and by thereupon moving the end face 42 of the radially inner element 20 toward and beyond the end face 42 of the element 18 so that the pockets 22 of the element 20 receive progressively increasing portions of the springs 24. Each spring 24 is then located in the space between the two end faces 41, 43 of the element 18, the end face 44 of the element 20 is or can be flush with the end face 41, and the end face 42 of the element 20 can be located between the end faces 41, 43 of the wider or thicker element 18.

The character 45 denotes that portion of the inner side of the element 18 which is located between the end face 43 and the adjacent fully confined and clamped spring 24, and the character 46a denotes that portion of the surface of the element 20 within a pocket 22 which is immediately surrounded by the adjacent spring 24. The confronting surfaces of the elements 18, 20 not only ensure that the springs 24 are properly held or confined in the respective pairs of pockets 21, 22 but such surfaces further ensure (in cooperation with the springs 24) that the elements 18, 20 of a properly assembled module are held against axial movement relative to each other (in a direction to the left and/or in a direction to the right, as viewed in FIG. 6).

In order to even more reliably ensure that the elements 18, 20 are held against excessive axial movement in a direction toward or into each other (i.e., in a direction of assembling the module but beyond the optimum axial positions relative to each other), as well as against separation in a direction counter to the direction of assembling the module, the confining portions 46, 47 extend axially of the module as well as circumferentially of the respective coil springs 24 (see FIGS. 4 and 5). This even further ensures predictable and convenient manipulation of the module in the manufacturing plant, in storage, during shipment as well as during assembly with other constituents of the apparatus 1.

The confining portions 47 of the radially inner element 20 of the damper 2 have resilient tongues or lugs 48 radially inwardly of the respective springs 24 and spaced apart from the end convolutions of the respective springs 24, i.e., remote from the respective stops 21a and 22a. The resilient tongues 48 of the confining portions 47 cooperate with the preferably rigid confining portions 46 to ensure that the properly coupled elements 18, 20 of a module are reliably held against axial movement relative to each other in either one of the two possible directions, i.e., to push the element 20 to the left or to push this element to the right of the proper axial position shown in FIG. 6.

The width of the tongues 48 can be greater or less than that shown in FIGS. 4 and 5, as long as each such tongue overlies or underlies at least one intermediate convolution of the adjacent coil spring 24. The tongues 48 may but need not engage the central convolutions of the respective springs 24 (FIGS. 4 and 5 show that each tongue 48 is nearer to one axial end than to the other axial end of the respective spring 24). It is equally possible to employ shorter tongues 48 or to employ tongues which overlie or underlie nearly all convolutions of the adjacent springs 24. Still further, it is possible to provide the radially inner element 20 of FIGS. 4 and 5 with two or more equidistant or randomly spaced apart tongues for each spring 24.

The tongues 48 can resemble or constitute hooks, pawls, lugs or the like. Such tongues are preferably of one piece with the plastic element 20. FIG. 4 further shows that the angular positions of all tongues 48 relative to the adjoining springs 24 need not be the same, i.e., one or more tongues 48 can be nearer to the counterclockwise axial end(s) and the other tongue or tongues 48 can be nearer to the clockwise axial end(s) of the respective springs 24. Moreover, certain tongues 48 can be angularly offset relative to the respective confining portions 46 of the element 18. For example, each of the confining portions 46 can be flanked by a pair of tongues 48 (as seen in the circumferential direction of the elements 18 and 20).

The resiliency of the tongues in the radial direction of the annular element 20 and the length of such tongues in the circumferential direction of the element 20 are selected in such a way that, when the assembly of the module including the elements 18, 20 and (as shown, by way of example, in FIGS. 4 and 5) four springs 24 is completed, the tongues 48 offer adequate resistance to undesirable (unintentional) dismantling of the module. If the assembly of a module involves an initial step of inserting portions of the four springs 24 into the pockets 21 of the radially outer annular input element 18 and a subsequent step of pushing the element 20 axially toward the position of FIG. 6, the tongues 48 yield radially inwardly during a first stage of such axial movement of the element 20 and thereupon expand radially outwardly to hug the adjacent convolutions of the respective springs 24 in a manner as shown in FIGS. 4, 5 and (particularly) 6 and 2.

In order to take a properly assembled module (including the parts 18, 20 and 24) apart, it is necessary to exert a force which suffices to effect a renewed deformation of the tongues 48 radially inwardly so that such tongues can slide over and beyond the radially innermost portions of the adjacent convolutions forming part of the respective springs 24. It is presently preferred to select the resiliency of the tongues 48 in such a way that the module can be assembled by hand but that, once the element 20 is adequately fitted into the element 18 and into the set of springs 24 in the pockets 21 of the element 18, accidental dismantling or taking apart of the module is highly unlikely.

Figure 9:
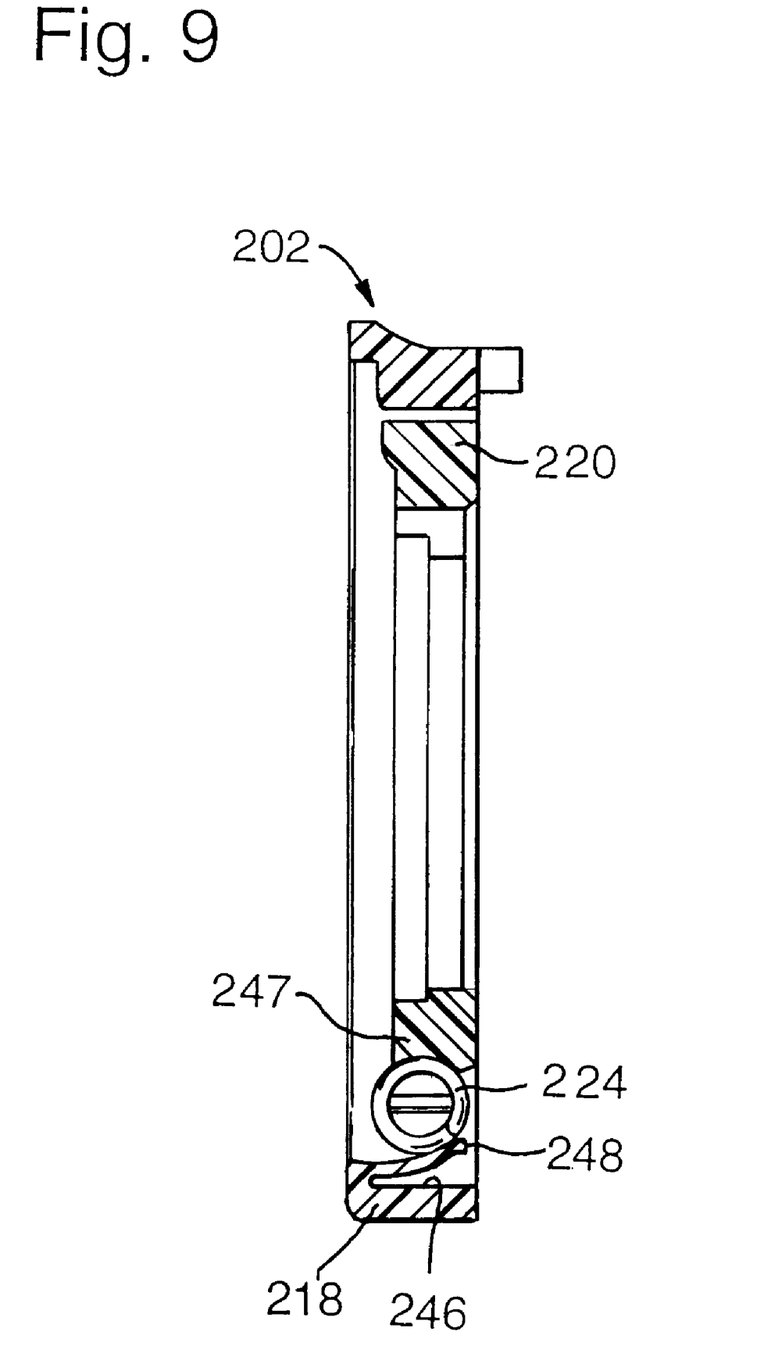
FIG. 9 is a composite axial sectional view of certain details of a damper of the present invention constituting modifications of the corresponding details of the damper shown in FIGS. 1–6.

In FIG. 9, a damper 202, confining portions 246 of the radially outer element 218 have resilient tongues or lugs 248 radially outwardly of the respective springs 224. The resilient tongues 248 of the confining portions 246 cooperate with preferably rigid portions 247 of radially inner element 220 to ensure that the properly coupled elements 218, 200 are reliably held against relative axial movement.

During assembly, as described above, the tongues 248 yield radially outwardly during the first stage and thereupon expand radially inwardly to hug the convolutions of the springs 224. During disassembly, as described above, it is necessary to exert sufficient force to deform the tongues 248 radially outwardly so that the tongues 248 can slide over and beyond the radially outermost portions of the convolutions of the springs 224.

When the input member 4–7 and the output member (flange) 8 of the second damper 3 begin to turn relative to each other during actual use of the improved torsional vibration damping apparatus 1, the springs 13 of the damper 3 begin to store energy rather than storing additional energy. The reason is that, in accordance with a presently preferred embodiment, the dimensions and the angular positions of the windows 14, 15 and 16 in the discs 5, 7 and in the flange 8 are selected in such a way that the springs 13 are unstressed or practically unstressed in the neutral or starting condition of the damper 3. This can be readily achieved by selecting the lengths of the windows 14–16 (as seen in the circumferential direction of the parts 5, 7 and 8) in such a way that the length of each of the windows 14, 15 matches or at least closely approximates the length of the window 16 between them.

Alternatively, the dimensions of the windows 14, 15, 16 and of the springs 13 can be selected in such a way that the springs 13 are prestressed to a preselected extent when the second damper 3 is idle. However, it is presently preferred to assemble the apparatus 1 in such a way that the initial stressing of the springs 13 (when the damper 3 is not in use) is at least close to zero. Some initial stressing of the properly installed springs 13 in their respective sets of windows 14–16 is desirable on the ground that the apparatus 1 is less likely to generate noise as a result of stray movements of the springs 13 in the circumferential direction of the elements 18, 20 in the idle condition of the damper 3. For example, the initial stressing of the springs 13 can be such that the moment of resistance developing between the parts 5, 7 and 8 as a result of initial stressing of the springs 13 is greater than the maximum torque adapted to be transmitted by the first damper 2, i.e., by the springs 24. Such maximum torque develops when the teeth of the internal profile 9 of the flange 8 actually abut the teeth of the external profile 10 of the hub 11.

On the other hand, it might be desirable (under certain circumstances) to select the initial moment of resistance furnished by the springs 13 of the second damper 3 (the springs 13 are stressed ahead of the springs 24) in such a way that it is less than the maximum (final) torque transmittable by the spring 24. Such selection of the bias of the springs 13 and 24 ensures that, at least during a certain stage of angular movability of the input member 4–7 and output member 8 of the damper 3 relative to each other, the springs 24 are compressed (or further compressed) simultaneously with compression of the springs 13 in the first stage of the damper 3 (provided that the damper 3 is designed to embody two or more stages). Thus, the springs 13 and 24 then operate in series and are compressed simultaneously until the angular displacement of the flange 8 and the hub 11 relative to each other reaches a stage at which the teeth of the profile 9 engage the teeth of the profile 10.

The first damper 2 is or can be designed in such a way that it permits an angular displacement of the output member (flange) 8 and the hub 11 through an angle of at least 200. In the embodiment of FIGS. 1 to 6, the magnitude of such angle is determined by the selected maximum play between the teeth of the profiles 9 and 10, namely the play 8a in the direction of pull and the play 8b in the direction of push. The final or maximum torque which can be generated by the springs 24 is preferably in the range of between 4 and 20 Nm. The maximum torque which can be transmitted by the first damper 2 develops when the teeth of the profile 9 abut the teeth of the profile 10; such maximum torque (transmittable by the springs 24) is preferably in the range of between 4 and 16 Nm.

The maximum angular displacement between the members 4–7 and 8 of the second damper 3 is or can be in the range of at least 15°. The resistance which the springs 13 of the damper 3 offer to turning of the members 4–7 and 8 relative to each other can be in the range of between 5 and 40 Nm/°, preferably between about 10 and 25 Nm/°. On the other hand, the resistance which the springs 24 offer to angular displacement of the elements 18, 20 relative to each other can be in the range of between about 0.3 and 1.5 Nm/°.

FIGS. 4 and 5 show that the illustrated first damper 2 is a single-stage damper. However, and as already pointed out hereinbefore with reference to the second damper 3, it is possible to employ multistage dampers (this holds true for the damper 3 as well as for the damper 2).

The angle amounting to the difference between the maximum possible angular movement permitted by the first damper 2 and the effective angle of the friction generating arrangement including the friction ring 32 can be in the range of between about 10° and 35°.

The apparatus 1 of FIGS. 1 to 6 is susceptible of numerous additional modifications without departing from the spirit of the invention. For example, the element 20 of the damper 2 can comprise rigid confining portions 47 and the confining portions 46 of the element 18 can be resilient, either entirely or in part. It is also possible to employ at least partly resilient confining portions 47 (48) in conjunction with at least partly resilient confining portions 46. In other words, at least one of these confining portions can be rigid (either entirely or in part) or resilient (either entirely or in part).

An important advantage of a damper (2) which can be assembled into a module at the manufacturing plant (either manually or by resorting to automated machinery) is that this greatly simplifies the assembly of the entire apparatus 1, either at the manufacturing plant or at the locale of actual use (e.g., in an automobile assembly plant). Thus, the module constituting the damper 2 can be assembled with the damper 3 and other constituents of the apparatus 1 right at the locus of making the parts of the module or subsequent to transport of the module to a different location.

Another advantage of the disclosed damper 2 is that, owing to the aforedescribed design of the surfaces bounding the pockets 21, 22 and the materials and the configuration of faces and tongues on the confining portions 46 and 47, it is possible to ensure an optimum retention and guidance of the springs 24 in actual use of the damper 2. For example, it is possible to employ relatively or extremely long springs 24 which can be bent, either entirely or to a certain extent, prior to introduction into the respective pairs of pockets 21 and 22. The utilization of relatively long coil springs 24 is desirable on the ground that the resistance to deformation within the range of angular movements of the elements 18, 20 relative to each other is highly satisfactory (such as sufficiently low).

As concerns the advantages of dampers employing relatively long coil springs, reference may be had also to the aforementioned U.S. patent application Ser. No. 08/475,295.

FIGS. 7 and 8 show a portion of a modified the improved torsional vibration damping apparatus. The first damper of this apparatus comprises an annular input element 118, an annular output element 120 and energy storing devices in the form of coil springs 124 forming part of means for separably but reliably coupling the elements 118, 120 against undesirable or unintentional axial movement relative to each other. The coupling means further comprises confining portions 146, 148 which are respectively provided on the elements 118, 120 adjacent the respective pockets 121, 122 of such elements. The confining portions 146, 148 are disposed at the ends of the respective pockets 121, 122 (as seen in the circumferential direction of the respective elements 118, 120), namely they are disposed at the respective abutments or stops 121a, 122a for the adjacent end convolutions of the springs 124.

For example, each of the confining portions 146, 148 can extend beyond the adjacent stop 121a or 122a (as seen in the circumferential direction of the respective pocket 121 or 122) through a relatively short distance (e.g., between 0.5 and 2 mm) and the portions 146, 148 can be of one piece with the adjacent stops 121a, 122a. Such relatively short confining portions overlie the adjacent end convolutions of the respective springs 124. The overlap can take place radially outwardly or radially inwardly of the respective end convolutions. FIGS. 7 and 8 show that the confining portions 146 are located radially inwardly and that the confining portions 148 are located radially outwardly of the adjacent springs 124.

It will be seen that, in contrast to the tongues 48 shown in FIGS. 4–6 (these tongues engage several intermediate convolutions of the adjacent springs 24), the confining portions 146, 148 merely engage and hold the end convolutions of the adjacent springs 124 forming part of a (first) damper which further includes the annular input and output elements 118, 120. Of course, it is equally possible to select the dimensions of the confininng portions 146, 148 in such a way that each such portion can engage two or more convolutions at the ends of the adjacent springs 124.

The confining portions 146 are functional equivalents of the tongues 48 of the confining portions 47, and the confining portions 148 perform the functions of the confining portions 46. The configuration of the surfaces bounding the pockets 121, 122 can be the same as or analogous to that of the surfaces bounding the pockets 21, 22 of the elements 18, 20 in the damper 2 of FIGS. 1 to 6.

The springs 124 are preferably caused to assume the required arcuate shape prior to insertion into the pockets 121 or 122 as an initial step of converting the parts 118, 120 and 124 into a preassembled unit or module which can be utilized in a torsional vibration damping apparatus. For example, the first step of assembling a module can involve inserting properly curved springs 124 into the pockets 121 of the annular element 118, preferably in such a way that the insertion involves a slight axial compression (shortening) of the springs 124. It is also possible to insert the springs 124 into their pockets 121 by moving the springs radially outwardly of the element 118 until they reach and can enter the respective pockets 121. The next step involves axial movement of the element 120 toward the element 118 and simultaneous entry of springs 124 into the pockets 122. This involves a certain deformation of the springs 124 by the confining portions 146. In order to facilitate such deformation (and hence the assembly of the module), each of the confining portions 146 can be provided with a suitably configurated slope or ramp. For example, each of the portions 146 can constitute a ramp. The configuration of the confining portions 146 can be such that each thereof exhibits a sloping portion 146a which extends from the exposed or open side 142 of a pocket 122 in the element 120. The portions 146a can slope in the circumferential direction of the element 120; this ensures that, during assembly of the module, the adjacent end convolutions of the springs 124 can slide along the sloping portions 146a which causes the springs 124 to undergo the required axial compression. When the end convolution of a spring 124 has advanced beyond the adjacent confining portion 146, the spring 124 can dissipate some energy and snaps behind the confining portion 146 to thus ensure that the spring is adequately and reliably confined in its pocket 122.

The configuration of the confining portions 148 can be identical with or analogous to that of the just described confining portions 146; this simplifies and facilitates satisfactory introduction of the springs 124 into the pockets 121 of the element 118. Thus, the configuration of the confining portions 148 is or can be such that the adjacent end portions of the springs 124 are automatically compressed in the longitudinal direction of such springs before the springs can dissipate some energy while entering the pockets 121 of the element 118.

An important feature which is common to all described and illustrated embodiments of the improved torsional vibration damping apparatus is that the parts of the first damper (including the constituents 18, 20, 24 or 118, 120, 124) are configurated and dimensioned in such a way that they can be assembled into a module wherein the springs 24 or 124 cooperate with the confining portions (46, 47 or 146, 148) of the annular elements 18, 20 or 118, 120 to hold such elements against axial movement relative to (particularly away from) each other with a force which is required to ensure convenient manipulation of the modules in storage, during shipment and/or during incorporation into a torsional vibration damping apparatus such as the clutch disc or clutch plate of a manually operable or automated torque transmitting system (e.g., a friction clutch) in the power train of a motor vehicle. This entails unexpectedly high savings in time and cost of assembling, storing and installing a torsional vibration damping apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration damping apparatus and, therefore, such adaptations should and are intended to be comprehended within the meaning and range of equivalence of the appended claims.

What is claimed is:

1. A torsional vibration damping apparatus, comprising an input component and an output component, said input and output components being rotatable with and relative to each other about a common axis; at least one damper arranged to oppose said relative rotation comprising input and output elements rotatable respectively with said input and output components, said input and output elements being movable relative with each other along said axis, each of said elements having at least one pocket; and at least one energy storing device deformable in a circumferential direction of said elements and extending into the at least one pocket of said input element and into the at least one pocket of said output element, said elements having surfaces bounding said pockets thereof positioned and configured to locate the at least one energy storing device radially and along said axis, each of said elements further having confining means for said at least one energy storing device and cooperating therewith to couple said elements against movement relative to each other along said axis.

2. A torsional vibration damping apparatus, comprising a first damper and a second damper, said first damper including coaxial annular input and output elements rotatable with and relative to each other about a common axis; and each having at least one pocket, and at least one energy storing device deformable in a circumferential direction of said elements and extending into the at least one pocket of said input element and into the at least one pocket of said output element, said elements having surfaces bounding said pockets thereof positioned and configured to locate the at least one energy storing device radially as well as in the direction of said axis, each of said elements further having confining means for said at least one energy storing device and cooperating therewith to couple said elements against movement relative to each other in the direction of said axis.

3. The apparatus of claim 2, wherein said at least one energy storing device extends into the respective pockets of said elements as a result of axial movement of at least one of said elements toward the other of said elements against the opposition of at least one of (a) said energy storing devices and (b) said confining means.

4. The apparatus of claim 3, wherein said axial movement is terminated when said surfaces abut the at least one energy storing device in the respective pockets.

5. The apparatus of claim 3, wherein said confining means and said at least one energy storing device cooperate to couple said elements to said at least one energy storing device by snap action during a last stage of said axial movement of said at least one element toward said other element.

6. The apparatus of claim 2, wherein the confining means of at least one of said elements has a face which follows the outline of a portion of said at least one energy storing device radially of said axis and in said circumferential direction.

7. The apparatus of claim 6, wherein said face is provided on a projection of the respective confining means.

8. The apparatus of claim 2, wherein at least a portion of at least one of said confining means is resilient radially of said axis.

9. The apparatus of claim 8, wherein said resilient portion of said at least one confining means includes at least one tongue extending in at least substantial parallelism with said axis.

10. The apparatus of claim 2, wherein the confining means of one of said elements is at least substantially rigid and at least a portion of the confining means of the other element is at least partly resilient.

11. The apparatus of claim 10, wherein said other element is said output element.

12. The apparatus of claim 2, wherein said at least one pocket has a first end and a second end as seen in said circumferential direction, said confining means being disposed between the ends and spaced apart from at least one end of each pocket for said at least one energy storing device.

13. The apparatus of claim 2, wherein each of said pockets has a first end and a second end as seen in said circumferential direction, said confining means being closely adjacent at least one end of each pocket for said at least one energy storing device.

14. The apparatus of claim 2, wherein at least one of said confining means includes at least one tongue extending substantially in the direction of said axis and being disposed radially outwardly of said at least one energy storing device.

15. The apparatus of claim 2, wherein at least one of said confining means includes at least one tongue extending at least substantially in the direction of said axis and being disposed radially inwardly of said at least one energy storing device.

16. The apparatus of claim 2, wherein each of said pockets includes a channel for a portion of said at least one energy storing device.

17. The apparatus of claim 16, wherein said channels are arcuate and have centers of curvature at least close to said axis.

18. The apparatus of claim 2, including at least two energy storing devices, each of said at least two energy storing devices having said confining means therefor, at least one of said confining means for each of said at least two energy storing devices having a face that follows the outline of a portion of the respective each of said at least two energy storing devices radially of said axis and in said circumferential direction.

19. The apparatus of claim 2, wherein said confining means of said elements are disposed at opposite sides of a plane that includes said axis and is normal to said axis.

20. A torsional vibration damping apparatus, comprising a rotary input component; a rotary output component rotatable with and relative to said input component about a common axis, said output component including a hub having an internal profile and an external profile, and means for yieldably opposing rotation of said components relative to each other, including a first damper comprising a plurality of first energy storing devices having a first rigidity and a second damper comprising at least on second energy storing device having a second rigidity greater than said first rigidity, said first damper further comprising annular input and output elements rotatable relative to each other about said axis against the resistance of said first energy storing devices and said second damper further comprising input and output members rotatable relative to each other about said axis against the resistance of said at least one second energy storing device, said output element being non-rotatably secured to said hub and said output member having an internal profile mating with said external profile with limited freedom of angular movement relative to said hub, each of said elements having a plurality of pockets extending radially of said axis and circumferentially of said annular elements and each of said energy storing devices being received in part in one of said plurality of pockets of said input element and in part in one of said plurality of pockets of said output element and being compressible in said circumferential direction in response to rotation of said elements relative to each other, each pocket of said input element confronting one of said plurality of pockets of said output element and said elements having surfaces bounding said pockets and at least partially following the outlines of adjacent portions of the respective first energy storing devices, each of said elements further having confining means cooperating with at least one of said first energy storing devices to couple said elements against movement relative to each other in the direction of said axis, said first damper constituting a module which is preassembled as a result of axial movement at least one of said elements toward another of said elements and resulting coupiling of said elements to each other by way of said confining means and said at least one first energy storing device.

* * * * *